April 12, 1949.  M. T. GANNON  2,467,304
DUAL-PURPOSE LIGHT METER HAVING
SWINGING REFLECTOR
Filed Aug. 29, 1946

INVENTOR
Millard Tubbs Gannon
BY
Donald C. Brown
Attorney

Patented Apr. 12, 1949

2,467,304

UNITED STATES PATENT OFFICE 2,467,304

DUAL-PURPOSE LIGHT METER HAVING SWINGING REFLECTOR

Millard Tubbs Gannon, Cambridge, Mass., assignor to Polaroid Corporation, Cambridge, Mass., a corporation of Delaware Application August 29, 1946, Serial No. 693,616

2 Claims. (Cl. 88—23)

This invention relates to light meters and more particularly to dual purpose light meters adapted to function as brightness meters and as incident light meters.

Accurate information as to the intensity of light, both as to the brightness of an object or scene and/or the intensity of incident light, is an important factor in the practice of the photographic art. Light meters are widely used by photographers to assist in accurately determining light intensity, and many of these light meters are of the type incorporating a photoelectric cell and a microammeter calibrated in terms of light intensity for recording the electrical current generated by the cell when it is exposed to light. Some of these photoelectric type light meters are adapted to measure the brightness of an object or scene, and some of them are adapted to measure incident light. Adaptors are provided for use with some of the prior art photoelectric cell type light meters which when placed over the aperture which admits light to the photoelectric cell convert the meter to one which measures the other kind of light. This necessity for adding or removing an attachment makes the use of these meters cumbersome, complicated, and slow and presents the ever-present danger that the adaptor used to convert from one type reading to the other may be lost.

An object of the invention is to provide a light meter that can be used either as a brightness meter or as an incident light meter, and to which it is not necessary to add or remove attachments to change from one use to the other.

Another object of this invention is to provide a dual-purpose light meter which is compact and easy to operate.

A further object of this invention is to provide a dual-purpose light meter which is durable and which gives accurate results.

A further object of this invention is to provide a dual-purpose light meter which is adapted to be changed rapidly from one of its uses to the other use.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
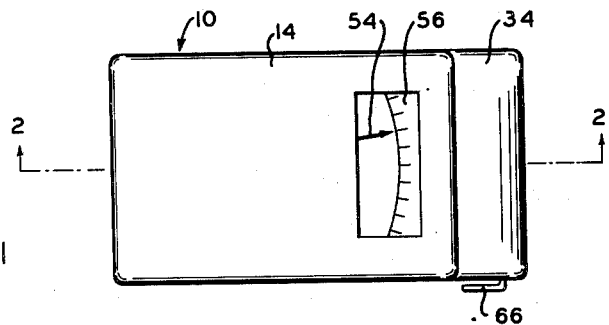
Figure 1 is a plan view of a dual-purpose light meter.
Figure 2:
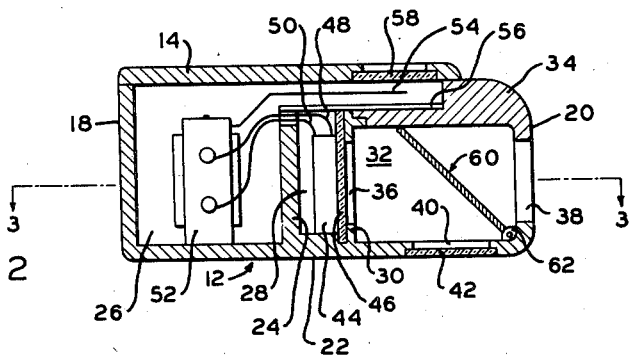
Fig. 2 is a sectional view taken along the line 2—2 of Fig. 1.
Figure 3:
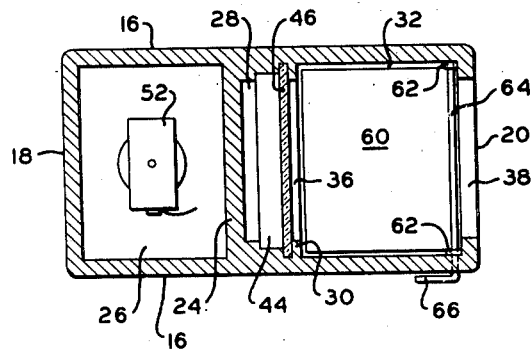
Fig. 3 is a sectional plan view taken along the line 3—3 of Fig. 2.

The dual-purpose light meter illustrated in Figs. 1, 2, and 3 and embodying one form of the present invention is of the type utilizing a photoelectric cell and is adapted to be held in the user's hand while in use. The light meter 10 consists of a casing comprising a body 12 and a cover 14 preferably consisting of a molded plastic, but it will be understood that the casing can be made of any other suitable material, as, for example, wood, or metal.

The body 12 of the casing has side walls 16, end wall 18, a second end wall 20, and bottom 22. The body 12 is also provided with a partition 24 which extends across the body portion between side walls 16 and extends upwardly from the bottom 22. The top of the partition 24 is spaced below the level of the top of side walls 16 and end wall 18 and forms a compartment 26 at one end of said body 12. A second compartment 28 is formed adjacent to compartment 26 by means of partition 30 also extending between side walls 16 and of the same height as partition 24. Partition 30 also forms a third compartment 32 in the other end of the body 12. Compartment 32 is completely covered over by means of a top portion 34 extending across side walls 16 and joining end wall 20 and partition 30 so that compartment 32 and top portion 34 form a hood structure. Partition 30 is provided with a centrally located rectangular light-admitting opening 36 the size of which is determined by the size of the photoelectric cell it is desired to use. End wall 20 is provided with a rectangular light-admitting opening 38 in line with opening 36, and a third opening 40 is centrally located in the bottom portion of compartment 32. The dimensions of opening 38 are proportional to the dimensions of opening 36. The actual dimensions are such that the angle of view of the meter taken from the opening 36 through opening 38 is approximately the same as the angle of view of the majority of conventional cameras. Opening 40 is covered by a diffusing means 42 as, for example, ground glass or opal glass. Compartment 28 contains a photo-electric cell of the self-generating or photovoltaic type and preferably a photovoltaic selenium blocking layer cell. The photovoltaic cell is indicated in the drawing generally by 44 and is located in compartment 28 with its light-sensitive surface facing and adjacent to opening 36 but separated from said opening by means of a protecting sheet of glass or transparent colorless plastic 46. The terminals of the photovoltaic cell 44 are connected by means of electrical conductors 48 and 50 to a microammeter 52 which is located in compartment 26. Microammeter 52 is provided with a pointer 54 which extends over a scale or dial 56 which is attached to the top of partition 24, partition 30, and a portion of the top portion 34. The dial member 56 may be calibrated in any convenient manner as, for example, to indicate the intensity of the light being measured or to indicate directly the correct camera setting for the light intensity being measured.

The edges of cover 14 are attached by any convenient fastening means to the top of the end wall 18, the side walls 16, and top portion 34 so as to completely enclose compartments 26 and 28. The cover 14 is provided with a glass-covered opening 58 located over the microammeter pointer and the dial so that the pointer and dial are visible.

The hood, which is formed by compartment 32 and the top portion 34, is provided with a reflector 60 which may be highly polished metal, a glass or plastic mirror, or any other suitable reflecting means. Reflector 60 is hinged to the bottom portion 22 by means of hinge bearings 62 and hinge pin 64 so that it can be rotated from a position extending along the bottom portion 22 and covering the opening 40 upwardly into the hood at an angle of 45 degrees to reflect light passing through diffusing means 42 and opening 40 onto the photovoltaic cell 44. It will be noted that when reflector 60 is in this last-mentioned 45-degree-angle position it effectively blocks the passage of light from opening 38 and thus prevents light from that opening from striking the photovoltaic cell 44. Hinge pin 64 extends through one side wall 16 and is provided with an operating lever 66 by means of which reflector 60 may be rotated from the position covering opening 40 to the 45-degree-angle elevation wherein it blocks the passage of light entering opening 38. It will be understood that bearings 62 will preferably be tight enough to frictionally hold reflector 60 in either position or that other tensioning means will be provided to hold the reflector in either extreme position.

To obtain the value of light reflected from an object or the brightness of an object or a scene, reflector 60 will be rotated by means of operating lever 66 into position where it lies parallel to the bottom member 22 and covering the opening 40. The meter will then be held with the opening 38 pointed at the object or scene, the brightness of which is to be evaluated. The light admitted through opening 38 will pass through opening 36 and strike the photovoltaic cell 44, causing the cell to generate an electric current. This electric current is conducted by means of electrical conductors 48 and 50 to the microammeter 52, causing the microammeter pointer or indicator 54 to rotate across the graduations on the dial 56.

To operate the meter as an incident light meter, the reflector 60 is swung upwardly to an angle of 45 degrees with the bottom member 22 by means of operating lever 66. The meter is then held with opening 40 parallel to and facing away from the surface or object on which it is desired to measure the incident light. The incident light which would normally strike the surface or object will strike the diffusing means 42 and be diffused in passing therethrough and be reflected by the reflector 60 onto the photovoltaic cell 44 which again generates an electric current which is measured by microammeter 52 and indicated by the pointer 54.

It will be obvious to those skilled in the art that the dimensions of the hood portion may be so proportioned, and opening 40 so located, that the diffusing means 42 can be placed over opening 38 instead of opening 40. With the meter so modified the value of reflected light or the brightness of an object or scene will be obtained by elevating reflector 60 into the 45-degree angle position and holding the meter with opening 40 pointing at the object or scene, the brightness of which is to be evaluated. To operate the meter thus modified as an incident light meter, the reflector 60 will be lowered to cover opening 40 and the meter will be held with opening 38 parallel to and facing away from the surface or object on which it is desired to measure the incident light.

It will also be appreciated that the openings 38 and 40 can be provided, in a manner old and well known in the art, with removable or hinged closures or flaps which carry slots or perforations for use in extending the operating range of photoelectric cell 44 and microammeter 52.

It will also be appreciated that reflector 60 can be so counter-balanced that it will automatically swing into the correct position as the meter is moved from one position to the other.

Since certain changes in the constructions set forth which embody the invention may be made without departing from its scope, it is intended that all matter contained in the above description, or shown in the accompanying drawings, shall be interpreted as illustrative and not in a limiting sense.

What is claimed is:

1. A casing for a light meter of the class having a photoelectric cell electrically connected to an electrical indicating means and mounted in a casing comprising an opaque enclosing hood, said hood comprising side walls, a bottom wall, an end wall and a top portion, said walls comprising a portion of said casing and having light-admitting openings formed in said end wall and said bottom wall, a framed opening adapted to position the light-sensitive surface of the photoelectric cell adjacent that end of said hood opposite said end wall to intercept light entering said end wall opening and passing longitudinally of said hood, said hood being arranged so that only light passing through said two wall openings can reach said surface, light-diffusing means mounted in one of said wall openings, and means hingedly mounted in said hood to selectively permit light passing through one of said wall openings to enter said framed opening to thereby strike said photoelectric cell, said last-named means comprising a reflector adapted to rotate between a position covering said bottom wall opening and a position wherein its reflecting surface is at an angle of substantially 45° to the plane of said bottom wall opening, said reflector cooperating with said top portion to prevent any light passing through said end wall opening from entering the framed opening to thereby strike said light-sensitive surface when said reflector is in said second position.

2. A casing for a light meter of the class having a photoelectric cell electrically connected to an electrical indicating means and mounted in a casing comprising a opaque enclosing hood, said hood comprising side walls, a bottom wall, an end wall and a top portion, said walls comprising a portion of said casing and having light-admitting openings formed in said end wall and said bottom wall, mounting means associated with said casing defining an exposure area and arranged so as to position the light-sensitive surface of the photoelectric cell adjacent that end of said hood opposite said end wall to intercept light entering said end wall opening and passing longitudinally of said hood, said hood being arranged so that only light passing through said two wall openings can reach said surface, light-diffusing means mounted in one of said wall openings, and means hingedly mounted in said hood to selectively permit light passing through one of said wall openings to thereby enter said exposure area and strike said photoelectric cell, said last-named means comprising a reflector adapted to rotate between a position covering said bottom wall opening and a position wherein its reflecting surface is at an angle of substantially 45° to the plane of said bottom wall opening, said reflector cooperating with said top portion to prevent any light passing through said end wall opening from entering said exposure area to thereby strike said light-sensitive surface when said reflector is in said second position.

MILLARD TUBBS GANNON.

REFERENCES CITED

The following references are of record in the file of this patent:

UNITED STATES PATENTS

| Number | Name | Date |
|---|---|---|
| 1,918,206 | Ermisch | July 11, 1933 |
| 1,990,361 | Bailey | Feb. 5, 1935 |
| 2,092,588 | Roach | Sept. 7, 1937 |
| 2,245,522 | Bernhard et al. | June 10, 1941 |
| 2,305,978 | Melchor | Dec. 22, 1942 |
| 2,389,617 | Freund | Nov. 27, 1945 |